COMMUNICATION SYSTEM
Filed May 4, 1951
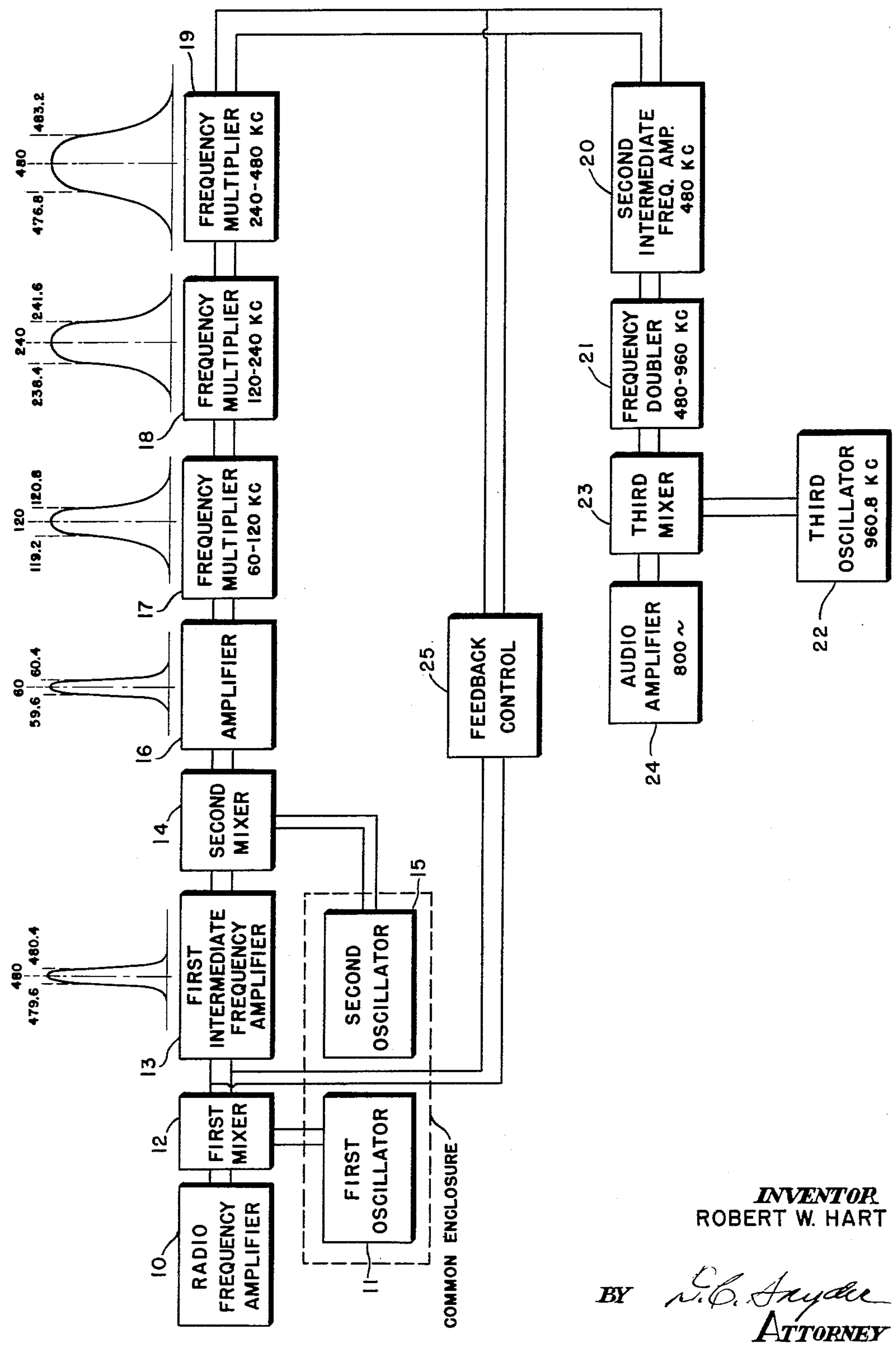
INVENTOR
ROBERT W. HART
BY [signature]
ATTORNEY

United States Patent Office 2,713,118

Patented July 12, 1955

2,713,118

COMMUNICATION SYSTEM

Robert W. Hart, Lynn, Mass.

Application May 4, 1951, Serial No. 224,633

6 Claims. (Cl. 250—20)

(Granted under Title 35, U. S. Code (1952), sec. 266)

This invention relates in general to communication systems and, in particular, to selective receivers for use in such systems.

Present day radio communications are greatly hampered by overcrowding of assigned bands and by the failure of many operators to control the frequency drift of their transmitters in a proper manner. Interference resulting from the latter condition is particularly objectionable. An ideal solution of this difficulty is a system composed of extremely stable transmitting stations and very sharply tuned and stable receivers. Transmitting stations may be stabilized in frequency by application of known engineering principles to their design. It is considered practicable to design radio transmitting stations with variations of less than 30 cycles in emitted frequencies while keying at modate transmission speeds. Assuming availability of highly stabilized transmitters, development of a complete communication system requires the provision of a suitable receiver. The receiver must have a very narrow effective pass band and be stable in its ability to continuously receive the desired transmitted signal and reject the unwanted. If all unwanted signals are stable in frequency and transmitters are all tuned to slightly different frequencies, the rejection properties of the receiver will determine the communication reliability. On the other hand, if the frequencies of unwanted signals vary, the receiver must include "anti-ringing" properties to prevent tuned circuits from being impact excited as the frequency of the unwanted signal swings through the pass range of the receiver. One of the principal factors concerning the "anti-ringing" properties of the receiver described herein, is the prospect of using lower "Q" tuned circuits than is customary in very narrow band receivers. The decay time of an oscillation introduced in the tuned circuit by impact will be relatively short whether this oscillation is due to unwanted signals or electrical "noise."

The amplitude of damped oscillations introduced into a tuned circuit is also a function of the time of exposure to the impact. In the case of unwanted signals, this may be measured in terms of the number of cycles that the frequency of the unwanted signal remains effectively in resonance with the tuned circuit.

Therefore, it is an object of the present invention to provide a receiver which increases the rate of frequency variation of such an unwanted signal and reduces the length of time the tuned circuits are exposed to the electrical impact.

It is a further object of the present invention to provide a receiver having high frequency stability.

It is another object of the present invention to provide a receiver having a narrow effective pass band without the use of commensurately sharply tuned circuits.

It is a further object of this invention to provide a receiver capable of receiving signals of great frequency stability in a band crowded with signals of considerably less frequency stability.

It is still further an object of this invention to provide a receiver which eliminates interference caused by signals having frequency drift or any considerable amount of frequency modulation.

With these objects in view, the invention resides in the elements as described in the following specification which is accompanied by a drawing, the single figure of which is a block diagram of a radio receiver.

This receiver involves heterodyning principles and employs a novel arrangement of relatively wide band stages and frequency multipliers for producing a degree of selectivity greater than heretofore has been obtainable in conventional receivers employing sharply tuned circuits. The narrow band operation results in the reception of only those signals having the highest frequency stability. Signals having only good stability will drift across the narrow reception band of the receiver, but their interfering potentialities are reduced to a minimum since their reaction on the receiver is intermittent and negligible in comparison to the steady signal being read. It was suggested above that in certain circumstances a receiver having a pass band of plus or minus 30 cycles would be desirable. However, by way of example, a receiver having an over-all pass band of plus or minus 50 cycles will be described. As will be pointed out hereinafter, the individual intermediate amplifier stages may have a pass band of plus or minus 400 cycles which is well within the region that is easily obtainable by use of conventional circuits. To facilitate the explanation of the invention, certain frequencies have been ascribed to the radio frequency stages of the receiver and the various local oscillators employed in the receiver. However, it is to be understood that these frequencies are included by way of example only and that the invention is not to be limited to such frequencies.

Referring to the drawing, the radio frequency amplifier 10 is tuned to receive a signal in the 3500 to 4000 kc. range. The first oscillator 11 is an extremely stable oscillator capable of producing an output signal in the 3020 to 3520 kc. range. The tuning of first oscillator 11 is tracked with that of radio frequency amplifier 10 and the outputs of both are applied to the first mixer 12 from which a resultant frequency signal is derived and applied to the first intermediate frequency amplifier 13. First intermediate frequency amplifier 13 is tuned to a peak at 480 kc. and has a pass band of 480±0.4 kc. The output of first intermediate frequency amplifier 13 is combined in a second mixer 14 with the output of a second oscillator 15, which provides a highly stable signal at 420 kc. Both first oscillator 11 and second oscillator 15 are of necessity capable of producing an output signal of the highest stability throughout their ranges. All conditions affecting the frequency of the output of each of these oscillators are controlled in such a manner that the effect of these conditions is proportionate. Further protection, as, for example, the illustrated common enclosure is provided to reduce frequency affecting conditions such as temperature variation to a minimum on both oscillators. Second oscillator 15 is tuned to provide an output frequency signal of 420 kc. which is 60 kc. removed from the 480 kc. center of the band to which first intermediate frequency amplifier 13 is tuned. Hence, the output of second mixer 14 centers at 60 kc. and may contain frequencies ranging from 59.6 to 60.4 kc. in view of the pass band of 0.8 kc. of first intermediate frequency amplifier 13. The output of second mixer 14 is then amplified in amplifier 16 which has a similar 0.8 kc. pass band. Appropriate terminal impedances are provided in amplifier 16 to match the input and output circuits. The output of amplifier 16, centered on 60 kc. is then passed to a frequency multiplier 17 wherein signals of all frequencies in the 59.6 to 60.4 kc. range are doubled in frequency, the output of multiplier 17 is centered at 120 kc. and includes all frequencies ranging from 119.2 to 120.8 kc. Similar frequency doubling is provided in multipliers 18 and 19, the final output from multiplier 19 containing signals in the range of 480±3.2 kc. By means of this multiplying action, all signals originally in the 800 cycle pass band of first intermediate frequency amplifier 13 have been spread over a band of 6.4 kc. From this 6.4 kc. band, the central 800 cycle segment is then selected by applying the output from multiplier 19 to a second intermediate amplifier 20, which is similar to first intermediate amplifier 13 in that it has a pass band of 800 cycles, being tuned to 480±0.4 kc. Thus, an effective sharpening of the receiver is accomplished because the band has been narrowed from that of the first intermediate frequency amplifier by a factor of 8. In terms of frequency, only those original intermediate frequency signals in the range of 479.95 kc. to 480.05 kc. are present in the output of second intermediate frequency amplifier 20. Second intermediate frequency amplifier 20 is coupled to a frequency doubler 21 which converts the applied signal to a 960 kc. signal. Finally, a third oscillator 22 sharply tuned to 960.8 kc. has its output applied with that of frequency doubler 21 to a third mixer 23, which provides an output signal of 800 cycles to audio amplifier 24. The purpose of the doubler 21 is to permit oscillator 22 to operate at a frequency well removed from the pass bands of intermediate frequency amplifiers 13 and 20 in order that no undesirable feedback will occur.

As stated previously the specific frequency ranges cited hereinabove in describing one embodiment of the invention are intended only to illustrate the operation of the receiver. Similar operation may be had at any reasonable communication frequency. Also, the particular values selected for band width of the various components have been cited merely in an exemplary sense. By way of further example, this invention may be employed to obtain a receiver having an over-all band width of 400 to 1,000 cycles which employs individual amplifier stages having band widths of 3,200 to 8,000 cycles.

In general, the relationship between the frequencies and band widths of the intermediate frequency amplifiers and oscillators may be expressed as follows:

Let:

$f_1$=the frequency of the first intermediate frequency amplifier 13

$f_2$=the frequency of second intermediate frequency amplifier 20

$f_0$=the frequency of oscillator 15

$W_1$=the band width of the first intermediate frequency amplifier 13

$W_2$=the band width of the second intermediate frequency amplifier 20

$M$=the combined multiplication factor of frequency multipliers 17, 18 and 19.

Then the output of the first intermediate frequency amplifier 13 will contain frequency in the band $$f_1 \pm \frac{W_1}{2}$$

The input to frequency multiplier 17 will have frequencies in the band $$(f_1 - f_0) \pm \frac{W_1}{2}$$

The output of multiplier 19 will contain frequencies in the band $$M(f_1 - f_0) \pm \frac{MW_1}{2}$$

M, $f_1$ and $f_0$ are selected so that $f_2$ is equal to $M(f_1-f_0)$ so that the output of multiplier 19 may be written as $$f_2 \pm \frac{MW_1}{2}$$

However, only signals within the band of $$f_2 \pm \frac{W_2}{2}$$

will be passed by the second intermediate frequency amplifier 20. If the ratio $W_2/W_1$ is made less than M which is the preferred condition of operation, the over-all pass band of the receiver may be expressed as $W_2/M$.

In addition to the circuit just described, a positive feedback circuit may be provided from the output of multiplier 19 to the input of first intermediate frequency amplifier 13. If this is done $f_2$ and $M(f_1-f_0)$ should be made equal to $f_1$. It will be understood that while the output of multiplier 19 and hence the signals fed back to first intermediate frequency amplifier 13 contain frequencies in the band $$f_1 \pm \frac{MW_1}{2}$$

only signals in the band $$f_1 \pm \frac{W_1}{2}$$

will be repassed by first intermediate frequency amplifier 13. Therefore, the presence of the feedback circuit will by itself serve to narrow the over-all pass band of the receiver. The feedback circuit is illustrated in the drawing as including a feedback control 25 which may be used to control the phase and amplitude of the feedback signal for optimum operation of the amplifier. In general control 25 should be adjusted to provide regenerative feedback.

If sufficient regeneration is employed, second intermediate frequency amplifier may be eliminated from the circuit and the added selectivity of the receiver provided solely by the feedback circuit. Alternatively, second intermediate frequency amplifier 20 may be employed without the feedback circuit 25 in which case the restriction that $f_1=f_2$ is no longer required.

While what has been described is the preferred embodiment it is considered within the scope of the present invention to add further stages of amplification, or to employ three or more intermediate frequency amplifiers tuned to discretely different frequencies. Further, the operation of the second oscillator of the invention may be modified by utilizing a plurality of oscillators and selector switches to provide a second mixer output of 240 kc., 120 kc., or 60 kc. for use respectively with one frequency doubler for broad band applications, two frequency doublers for medium band applications and three frequency doublers for narrow band operation. These as well as any of the conventional devices for sharpening the selectivity curve of a receiver are also considered to be properly within the scope of the present invention which is to be limited only by the spirit of the appended claims.

The invention described herein may be manufactured and used by or for the Government of the United States of America for Government purposes without the payment of royalty thereon or therefor.

What is claimed is:

1. A radio receiver having a narrow over-all band width comprising, a radio frequency amplifier for amplifying a modulated received signal, a first local oscillator for providing a signal differing in frequency from said received signal, means for tuning said radio frequency amplifier and said local oscillator in synchronism to maintain said frequency difference at a first fixed value, a first mixer coupled to said radio frequency amplifier and to said local oscillator for providing an output signal of frequency equal to said first fixed value, a first intermediate frequency amplifier coupled to said mixer and having a relatively broad pass band centered at a frequency equal to said first fixed value, a second local oscillator for providing a signal of a frequency of a second fixed value, said first and second fixed values differing by a third fixed value, a second mixer coupled to said second local oscillator and to said first intermediate frequency amplifier for providing an output signal of a frequency equal to said third fixed value, means for amplifying the output of said second mixer, first, second and third serially coupled frequency doublers, the first of said frequency doublers being coupled to the output of said last-mentioned amplifying means, the frequency spread of the output of said third multiplier being eight times the band width of said first intermediate frequency amplifier and centered at a frequency equal to said first fixed value and a second intermediate frequency amplifier having a pass band less than the frequency spread of the signals in the output of said third frequency multiplier and centered at a frequency equal to said first fixed value, and means coupled to said second intermediate frequency amplifier for detecting the modulating component of said received signal.

2. A receiver as in claim 1, said receiver further comprising means coupling the output of one of said frequency doublers to the input of said first intermediate frequency amplifier, said last-mentioned coupling means providing a positive feedback loop.

3. Apparatus as in claim 2 wherein said coupling means includes means for adjusting the phase and the amplitude of that portion of the output of said multiplier being fed back to said first intermediate frequency amplifier.

4. A radio receiver having a narrow over-all band width comprising, a radio frequency amplifier for amplifying a received signal, a first local oscillator for providing a signal differing by a first fixed value from the frequency of said received signal, a first mixer coupled to said radio frequency amplifier and to said first local oscillator for providing an output signal of frequency equal to said first fixed value, a first intermediate frequency amplifier having a relatively broad pass band coupled to said mixer, a second local oscillator for providing an output signal displaced by a second fixed value from the center frequency of the pass band of said first intermediate frequency amplifier, a second mixer coupled to said second local oscillator and to said first intermediate frequency amplifier for providing an output signal of frequency equal to said second fixed value, an amplifier coupled to said mixer for amplifying the output thereof, first, second and third frequency multipliers for doubling the frequency of the signal from said amplifier three times, the frequency spread of the output from said third multiplier being eight times the pass band of said first intermediate frequency amplifier, a second intermediate frequency amplifier for receiving the output of said third multiplier, said second intermediate frequency amplifier being substantially similar to said first intermediate frequency amplifier and having a similar pass band centered at a frequency equal to said first fixed value, a frequency doubler for doubling the frequency of the output of said second intermediate frequency amplifier, a third local oscillator for providing a signal displaced by an audio frequency from that of said doubler, a third mixer, means for applying the outputs of said third local oscillator and said double to said mixer, and an audio amplifier tuned to said audio frequency for providing a final output audio signal.

5. Apparatus as in claim 4 including a feedback circuit connected from said third multiplier to said first intermediate frequency amplifier and means for controlling the phase and amplitude of signals being fed back through said circuit.

6. A radio receiver comprising, means for heterodyning received signals to provide intermediate frequency signals, amplifying means having a predetermined pass band centered with respect to a first frequency for amplifying said signals, means for reducing the frequency without reducing the frequency spread of intermediate frequency signals obtained from said amplifying means, means for increasing the frequency of signals from said reducing means and thereby effectively expanding the band width of said amplifier, said frequency increasing means transposing said signals to a frequency band centered about said first frequency means for regeneratively feeding back a portion of the latter signals to the input circuit of said amplifier whereby the selectivity of the amplifier is increased, second amplifying means having a band width similar to said first band width for amplifying the output of the frequency increasing means and means cooperating with the output of said second amplifying means for providing an audio frequency signal.

References Cited in the file of this patent

UNITED STATES PATENTS

| | | |
|---|---|---|
| 1,420,055 | Nichols | June 20, 1922 |
| 1,660,930 | MacDonald | Feb. 28, 1928 |
| 1,802,760 | Gage | Apr. 28, 1931 |
| 2,154,073 | Koch | Apr. 11, 1939 |
| 2,205,762 | Hansell | June 25, 1940 |
| 2,282,974 | Koch | May 12, 1942 |
| 2,416,791 | Beverage | Mar. 4, 1947 |
| 2,486,076 | Strutt et al. | Oct. 25, 1949 |

FOREIGN PATENTS

| | | |
|---|---|---|
| 959,927 | France | Oct. 17, 1949 |